(12) United States Patent
Penttinen et al.

(10) Patent No.: US 9,181,010 B2
(45) Date of Patent: Nov. 10, 2015

(54) HEAT-SEALABLE BIODEGRADABLE PACKAGING MATERIAL, A METHOD FOR ITS MANUFACTURE, AND A PRODUCT PACKAGE MADE FROM THE MATERIAL

(75) Inventors: Tapani Penttinen, Huutjärvi (FI); Kimmo Nevalainen, Kotka (FI); Jurkka Kuusipalo, Tampere (FI); Tapio Koskinen, Siuro (FI); Sami Kotkamo, Tampere (FI)

(73) Assignee: Stora Enso OYJ, Helsinki (FI)

( * ) Notice: Subject to any disclaimer, the term of this patent is extended or adjusted under 35 U.S.C. 154(b) by 590 days.

(21) Appl. No.: 13/634,477

(22) PCT Filed: Mar. 11, 2011

(86) PCT No.: PCT/FI2011/050215
§ 371 (c)(1),
(2), (4) Date: Nov. 21, 2012

(87) PCT Pub. No.: WO2011/110750
PCT Pub. Date: Sep. 15, 2011

(65) Prior Publication Data
US 2013/0071677 A1    Mar. 21, 2013

(30) Foreign Application Priority Data
Mar. 12, 2010    (FI) ...................................... 20105247

(51) Int. Cl.
*B29C 47/06* (2006.01)
*B32B 27/10* (2006.01)
(Continued)

(52) U.S. Cl.
CPC ............ *B65D 65/466* (2013.01); *B29C 47/065* (2013.01); *B32B 5/02* (2013.01);
(Continued)

(58) Field of Classification Search
None
See application file for complete search history.

(56) References Cited

U.S. PATENT DOCUMENTS

| 5,753,724 | A | 5/1998 | Edgington et al. |
| 6,183,814 | B1 | 2/2001 | Nangeroni et al. |

(Continued)

FOREIGN PATENT DOCUMENTS

| EP | 0 109 499 A2 | 5/1984 |
| EP | 1 059 162 A2 | 12/2000 |

(Continued)

OTHER PUBLICATIONS

Machine translation of JP 2007-176143 A, Jul. 2007.*
Office Action dated Mar. 2, 2015 for Japanese Application No. 2012-557574, 8 pages.
Korean Office Action for Korean Patent Application No. 10-2012-7026778, dated Jun. 15, 2015.

*Primary Examiner* — Ramsey Zacharia
(74) *Attorney, Agent, or Firm* — Patterson Thuente Pedersen, P.A.

(57) ABSTRACT

A heat-sealable biodegradable packaging material, its manufacturing method and a product package formed thereof, where the packaging material comprises a fiber substrate, an inner polymeric coating layer against the fiber substrate, which contains polylactide and a biodegradable polyester that is blended therewith to improve the adhesion between the inner coating layer and the fiber substrate, and an outer coating layer that constitutes the outer surface of the material and contains polylactide and a biodegradable polyester that is blended therewith to improve the heat sealing ability of the layer, the portion of polylactide in the inner layer present in an amount greater than that in the outer layer. The inner and/or outer coating layers can further have blended therewith a small amount of acrylic copolymer that improves the adhesion and/or heat sealing ability. The coating layers can be introduced onto the fiber substrate by extrusion or coextrusion.

19 Claims, 1 Drawing Sheet

(51) Int. Cl.
  *B32B 27/30* (2006.01)
  *B32B 27/36* (2006.01)
  *B32B 37/15* (2006.01)
  *B65D 65/46* (2006.01)
  *B32B 27/12* (2006.01)
  *D21H 19/82* (2006.01)
  *B32B 5/02* (2006.01)
  *B32B 27/08* (2006.01)
  *D21H 27/10* (2006.01)
  *D21H 19/28* (2006.01)

(52) U.S. Cl.
  CPC ................ *B32B 27/08* (2013.01); *B32B 27/10* (2013.01); *B32B 27/12* (2013.01); *B32B 27/306* (2013.01); *B32B 27/308* (2013.01); *B32B 27/36* (2013.01); *B32B 37/153* (2013.01); *D21H 19/28* (2013.01); *D21H 19/824* (2013.01); *D21H 27/10* (2013.01); *B32B 2270/00* (2013.01); *B32B 2307/31* (2013.01); *B32B 2307/7163* (2013.01); *B32B 2307/7244* (2013.01); *B32B 2307/7246* (2013.01); *B32B 2439/40* (2013.01); *Y10T 428/31786* (2015.04)

(56) References Cited

U.S. PATENT DOCUMENTS

| | | |
|---|---|---|
| 6,326,440 B1 | 12/2001 | Terada et al. |
| 6,645,584 B1 | 11/2003 | Kuusipalo et al. |
| 2002/0065345 A1 | 5/2002 | Narita et al. |
| 2002/0127358 A1* | 9/2002 | Berlin et al. .............. 428/36.6 |
| 2005/0192410 A1 | 9/2005 | Scheer et al. |
| 2007/0184220 A1* | 8/2007 | Cleveland et al. .......... 428/34.2 |
| 2007/0259195 A1 | 11/2007 | Chou et al. |

FOREIGN PATENT DOCUMENTS

| | | |
|---|---|---|
| EP | 1 094 944 | 5/2001 |
| EP | 1 236 753 A1 | 9/2002 |
| EP | 1 504 895 A1 | 2/2005 |
| FI | 112624 B1 | 12/2003 |
| JP | 2007176143 A | 7/2007 |
| JP | 2009051210 A | 3/2009 |
| JP | 2010-69767 A | 4/2010 |
| KR | 10-2005-0042858 | 5/2005 |
| WO | WO 00/01530 | 1/2000 |
| WO | WO 2009/064052 A1 | 5/2009 |

* cited by examiner

HEAT-SEALABLE BIODEGRADABLE PACKAGING MATERIAL, A METHOD FOR ITS MANUFACTURE, AND A PRODUCT PACKAGE MADE FROM THE MATERIAL

RELATED APPLICATIONS

This application is a National Phase entry of PCT Application No. PCT/FI2011/050215, filed Mar. 11, 2011, which claims priority from FI Application No. 20105247 filed Mar. 12, 2010, the disclosures of which are hereby incorporated by referenced herein in their entirety.

FIELD OF THE INVENTION

The present invention relates to a heat-sealable, biodegradable packaging material comprising a fiber substrate and polymeric coating layers extruded onto the same, the manufacturing method of such packaging material and a closed product package made from the material.

BACKGROUND OF THE INVENTION

The fiber-based packaging material of product packages, such as packing paper or board, is usually provided with a polymeric coating that makes the package tight and by means of which the package can be closed by heat sealing. Multilayer coatings can comprise an inner EVOH, PET or polyamide layer that provides the material with an effective barrier to water vapor and oxygen, and an outer poly-olefin layer that makes the material heat-sealable. One disadvantage of the said widely-used coating polymers is, however, that they are not biodegradable.

Polylactide (PLA), which has reasonably good moisture and gas barrier properties that are adequate to many applications, has been used as the coating polymer of biodegradable packaging material; however, its use involves a number of problems. Polylactide as such is stiff and fragile, requiring a high extrusion temperature and a fairly large layer thickness to stick to the fiber substrate of the packaging material. Because of the high temperature, polylactide runs the risk of breaking, and in extrusion, the edges of a molten web tend to tear and pin holes easily remain in the extruded layer.

As a solution to said problems, the specification FI-112624 B (EP-1094944 B1, respectively) discloses an inner adhesion layer, which is co-extruded together with an outer polylactide layer and which consists of a biodegradable polymer, examples of which, according to the specification, include some commercial copolyesters, cellulose esters, and polyester amides. They facilitate the extrusion of polylactide and provide adhesion that prevents the coating from peeling off the fiber substrate.

Another problem with the use of polylactide in the outer coating layer of the packaging material is its fairly high melting point, and the resulting poor heat sealing ability. As an improvement to this, the specification US-2002/0065345 A1 discloses a biodegradable aliphatic polyester that is blended with polylactide, its portion in the mixture being at least 9%, and a tackifier, its portion in the mixture being at least 1%. As suitable aliphatic polyesters, the publication mentions polycaprolactone (PLC) and polybutylene succinate adipate (PBSA). According to the patent specification, the mixture can be extruded into a film, which can be axially or biaxially stretched and which can be attached to the fiber substrate by lamination. As a result, polymer-coated biodegradable packaging material is obtained, which has a considerably improved heat sealing ability.

The specification of US 2005/0192410 A1 describes polylactide films and coatings, wherein the processability of polylactide is improved by blending with it 10-40 weight-% of polycaprolactone and 5-10 weight-% of mineral particles. According to the specification, the mixture can be used in extrusion coating, but there is no reference to its adhesion to the fiber substrate or to its heat sealing ability in the specification. Instead, the specification describes the intermediate layers between the carrier and the PLA-based coating layer or the top layers that come on top of the PLA layer compare paragraph [0039] in the specification.

The specification of US 2007/0259195 A1 describes polylactide-based films, which contain, blended therewith, 0.1-10 weight-% of biodegradable polymeric additive, the purpose of which is to increase the crystallinity of the polylactide, improving its heat resistance. As examples of such additives, the specification presents FEPOL 2040 marketed by Far Eastern Textile, Taiwan, and Ecoflex marketed by BASF, both of which comprise polybutylene adipate terephthalate (PBAT). According to the specification, the mixtures can be extruded onto the fiber substrate in a conventional manner, but there is no reference to the adhesion of the mixture to the substrate or to the heat sealing ability of the coating thus obtained. In the specification, the intended improved heat resistance of PLA does not, however, refer to an improvement of the heat sealing ability but rather to its weakening.

SUMMARY OF THE INVENTION

According to one aspect of the present invention, there is a heat-sealable biodegradable packaging material comprising a fiber substrate and two or more polymeric coating layers that are extruded onto the fiber substrate, characterized in that the two or more polymeric coating layers include at least an inner coating layer that is placed against the fiber substrate and contains polylactide and a biodegradable polyester that is blended therewith to improve adhesion between the inner coating layer and the fiber substrate, and an outer coating layer that constitutes the outer surface of the material and contains polylactide and a biodegradable polyester that is blended therewith to improve the heat sealing ability of the layer, wherein the portion of polylactide in the inner layer being present in an amount greater than the portion of the polylactide in the outer layer.

In certain aspects of the present invention, the inner and outer coating layers contain the same biodegradable polyester blended therewith.

In certain aspects of the present invention, the inner and/or outer coating layers contain a biodegradable aliphatic-aromatic co-polyester.

In certain aspects of the present invention, the biodegradable copolyester is one that has been polymerized from 1,4-butanediol, adipic acid and terephthalic acid monomers.

In certain aspects of the present invention, the inner and/or outer coating layers further comprise blended therewith no more than 5 weight-% of acrylic copolymer that improves the adhesion and/or heat sealing ability.

In certain aspects of the present invention, the acrylic copolymer is ethylene butyl acrylate glycidyl methacrylate terpolymer.

In certain aspects of the present invention, the inner coating layer that is placed against the fiber substrate contains between about 55 wt-% to about 95 wt-% of polylactide, between about 5 wt-% to about 40 wt-% of biodegradable polyester, between 0 wt-% and about 5 wt-% of acrylic copolymer.

In certain aspects of the present invention, the inner coating layer that is placed against the fiber substrate contains between about 65 wt-% to about 90 wt-% of polylactide, between about 10 wt-% and about 30 wt-% of biodegradable polyester, and between 0 wt-% and about 5 wt % of acrylic copolymer.

In certain aspects of the present invention, the outer heat-sealable coating layer contains between about 35 wt-% and about 90 wt-% of polylactide, between about 10 wt-% and about 60 wt-% of biodegradable polyester, and between 0 wt-% and about 5 wt-% of acrylic copolymer.

In certain aspects of the present invention, the outer heat-sealable coating layer contains about 50 wt-% and about 80 wt-% of polylactide, between about 20 wt-% and about 45 wt-% of biodegradable polyester, and between 0 wt-% and about 5 wt-% of acrylic copolymer.

In certain aspects of the present invention, at least one polymeric intermediate layer is provided between the inner and outer coating layers. In some aspects, there are two or more polymeric intermediate layers provided between the inner and outer coating layers. In certain aspects, the intermediate layer or intermediate layers comprise polylactide, while in other aspects the intermediate layer or layers consist essentially of polylactide. In certain aspects, an intermediate layer consists of a biodegradable polymer that forms a barrier to water vapor and/or oxygen, such as polyvinyl alcohol or polyglycolic acid. In certain aspects, the biodegradable polymer intermediate layer is between two other intermediate layers.

According to certain aspects of the present invention, there is provided a method of manufacturing a packaging material, wherein in that at least two superimposed polymeric coating layers are extruded onto the fiber substrate, of which the inner coating layer that is in direct contact with the fiber substrate contains polylactide and a biodegradable polyester that is blended therewith to improve the adhesion between the inner coating layer and the fiber substrate, and the outer coating layer that constitutes the outer surface of the material contains polylactide and a biodegradable polyester that is blended therewith to improve the heat sealing ability of the layer, and wherein the portion of polylactide in the inner layer being higher than that in the outer layer.

In certain aspects of the present invention, at least three superimposed polymeric coating layers are extruded onto the fiber substrate, such that there is at least one intermediate layer between the inner and outer coating layers, which in certain aspects consists essentially of polylactide.

In certain aspects of the present invention, at least three superimposed polymeric coating layers are extruded onto the fiber substrate, such that at least one intermediate layer between the said inner and outer coating layers consists essentially of a biodegradable polymer, such as polyvinyl alcohol or polyglycolic acid, which improves the barrier to water vapor and/or oxygen.

In certain aspects of the present invention, the inner coating layer, the outer coating layer and one or more intermediate coating layers are introduced onto the fiber substrate by coextrusion.

In certain aspects, the product package of the present invention is closed by heat sealing between the top layer, which contains polylactide and a biodegradable polyester that is blended therewith, and uncoated fiber substrate on the opposite side of the material.

DETAILED DESCRIPTION OF THE PREFERRED EMBODIMENTS

Figure 1:
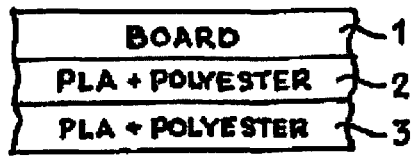
FIG. 1 is a cross-sectional schematic view of the sheet construction of an embodiment of the packaging material according to the present invention.

The purpose of the present invention is to provide polymer-coated, biodegradable packaging material, wherein the coating produced by extrusion and containing polylactide has both an improved adhesion to the fiber substrate and improved heat sealing ability. According to the present invention, the solution is that the material includes an inner coating layer against the fiber substrate, containing polylactide and a biodegradable polyester blended therewith to improve the adhesion between the layer and the fiber substrate, and an outer coating layer that forms the outer surface of the material and contains polylactide and a biodegradable polyester blended therewith to improve the heat sealing ability of the layer, the portion of polylactide in the inner layer being higher than that in the outer layer.

In the present invention, the biodegradable polyester that is blended with polylactide considerably improves the adhesion of polylactide, which by definition is weak, when it is extruded onto the fiber substrate, as well as the heat sealing ability of the extruded polylactide coating to an uncoated fiber substrate, in particular, but also to another film or coating layer containing polylactide. Consequently, the present invention provides an improved heat sealing ability of the coating without requiring the multistage film lamination according to the specification of US 2002/0065345 A1 for producing the coating.

According to the present invention, it has further been observed that, even though the added polyester improves both the adhesion of polylactide to the fiber substrate in the extrusion and its heat sealing ability, a smaller amount of added polyester is sufficient to improve the adhesion than to improve the heat sealing ability. Accordingly, optimal properties are achieved by dividing the coatings into two layers, of which the inner adhesion layer contains relatively more polylactide than the outer heat sealing layer. The solution of the present invention also provides savings in material costs, taking into consideration that the biodegradable polyesters that are blended are considerably more expensive than polylactide. In the inner adhesion layer and the outer heat sealing layer of the material, the same biodegradable polyester can be used as an admixture. Polyester as used herein refers to a polymer formed by at least one diol and at least one dicarboxylic acid or similar dihydric organic acid. Potential polyesters include aliphatic polyesters, such as PCL, for example, Mater-Bi marketed by Novamont, PBSA, polybutylene sucinate (PBS), such as GsPLA marketed by Mitsubishi, or an aliphatic-aromatic copolyester, such as PBAT, which is a copolymer polymerized from 1,4-butanediol, adipic acid and terephthalic acid monomers. An especially advantageous PBAT material is Ecoflex® marketed by BASF.

According to a preferred embodiment of the present invention, the adhesiveness of the inner coating layer that lies against the fiber substrate and/or the heat sealing ability of the outer layer that constitutes the outer surface of the material are further improved by a small amount, in certain aspects about 0.5 wt-% to about 5 wt-% of added acrylic copolymer. A preferable additive is, for example, ethylene butyl acrylate glycidyl methacrylate terpolymer. When the content of acrylic polymer in the coating layer is 5 weight-% at the most, it does not prevent the biodegradation of the packaging material in composting or in a dumping ground, even if the acrylic copolymer itself is not bio-degradable.

According to certain aspects of the present invention, the inner coating layer (adhesion layer) located against the fiber substrate can contain 55-95 weight-% of polylactide, 5-40 weight-% of biodegradable polyester, and 0-5 weight-% of acrylic copolymer. The portions of the said components are preferably within 65-90 weight-% of polylactide, 10-30 weight-% of biodegradable polyester, and 0-5 weight-% of acrylic copolymer.

The outer heat-sealable coating layer (heat sealing layer), in turn, can contain 35-90 weight-% of polylactide, 10-60 weight-% of biodegradable polyester, and 0-5 weight-% of acrylic copolymer. The portions of the components are preferably within 50-80 weight-% of polylactide, 20-45 weight-% of biodegradable polyester, and 0-5 weight-% of acrylic copolymer.

The packaging material can further be varied within the present invention, so that one or more biodegradable polymeric intermediate layers are placed between the said inner adhesion layer and the outer heat sealing layer to improve the technical properties of the multi-layer coating and/or because of costs. The intermediate layer can comprise, for example, mainly mere polylactide, whereby savings are made in the use of the more expensive polyester by delimiting it to only the thinner adhesion and heat sealing layers on both sides of the thicker polylactide layer. By thickening the coating by means of the PLA layer, the water vapor and oxygen barrier formed by it is improved. In addition to or instead of this, polymer layers that form a more effective water vapor or oxygen barrier can be arranged in the material, for example, from polyvinyl alcohol (PVOH) or polyglycolic acid (PGA).

The method according to the present invention for manufacturing the packaging material described above is characterized in that at least two superimposed polymeric coating layers are extruded onto the fiber substrate, of which the inner coating layer that comes into contact against the fiber substrate contains polylactide and a biodegradable polyester that is blended therewith to improve the adhesion between the layer and the fiber substrate, and the outer coating layer that constitutes the outer surface of the material contains polylactide and a biodegradable polyester that is blended therewith to improve the heat sealing ability of the layer, the portion of polylactide in the inner layer being higher than that in the outer layer.

As already mentioned, biodegradable intermediate layers that simply consist, for example, of polylactide and/or said biodegradable barrier polymers, such as PGA, can be incorporated into the coating between the inner adhesion layer and the outer heat sealing layer. All superimposed coating layers can be brought onto the fiber substrate by coextrusion at one stage.

The closed package formed from the packaging material described above, according to the present invention, is characterized in that it is closed by heat sealing the coating layer, which contains polylactide and the biodegradable polyester blended therewith and which forms the surface of the material. The heat sealing layer is particularly advantageously sealed to uncoated fiber substrate on the opposite side of the material. Instead of such packaging material that is coated on one side only, material that is coated on both sides can also be used, wherein the package is closed by sealing the coating layers to one another.

Now referring to the figures, the present invention is described in more detail by means of examples and with reference to the appended drawings, wherein FIGS. 1-8 show the sheet constructions of various embodiments of the packaging material according to the present invention.

The embodiment of the present invention according to FIG. 1 comprises a fiber substrate, such as packing paper or board 1, and two polymeric coating layers 2, 3 that are co-extruded onto the packing paper or board 1. The inner coating layer 2 consists of polylactide (PLA) and biodegradable polyester that is blended therewith, the purpose of which is to improve the adhesion between the inner coating layer 2 and the fiber substrate 1. The outer coating layer 3 also consists of polylactide and biodegradable polyester, the purpose of which is to improve the heat sealing ability of the outer coating layer 3. In particular, the outer coating layer 3 can be heat-sealed to the uncoated surface of the fiber substrate, such as the packing board 1, i.e., on the counter surface of the material according to FIG. 1, or to a corresponding heat-sealable polymer surface, for example, when folding the material into a bag and seaming it to itself. The polyester that is blended into the coating layers 2, 3 can comprise the same polyester, or different polyesters can be used in the layers. It is essential for the present invention that the portion of polylactide in the inner coating layer 2 is higher than that in the outer coating layer 3.

Figure 2:
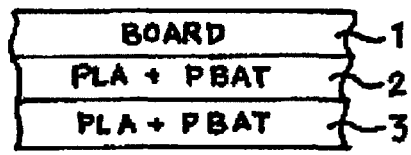
FIG. 2 is a cross-sectional schematic view of the sheet construction of another embodiment of the packaging material according to the present invention.

FIG. 2 shows the same packaging material sheet construction as FIG. 1, but the polyester included in the coating layers 2, 3 herein is defined, in an exemplary manner, to comprise the copolyester (PBAT) that is polymerized from 1,4-butanediol, adipic acid and terephthalic acid monomers. In the inner coating layer 2 lying against the fiber substrate 1, the portion of polylactide can be, for example, 60-95 weight-%, preferably 70-90 weight-%, and the portion of PBAT, respectively, 5-40 weight-%, preferably 10-30 weight-%. In the outer heat-sealable coating layer 3, the portion of polylactide can be 40-90 weight-%, preferably 55-80 weight-%, and that of PBAT, respectively, 10-60 weight-%, preferably 20-45 weight-%. It is required, however, that the portion of polylactide in the inner coating layer 2 is higher than in the outer coating layer 3.

The weight of the fiber substrate 1 in the embodiment according to FIGS. 1 and 2 can be within 40-350 g/m²; the weight of the inner coating layer within 5-20 g/m², preferably 5-10 g/m², and the weight of the outer layer within 5-20 g/m², preferably 5-10 g/m².

Figure 3:
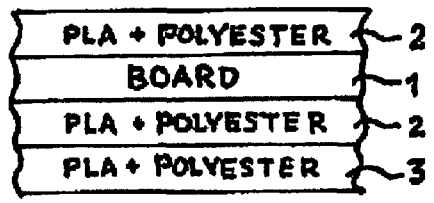
FIG. 3 is a cross-sectional schematic view of the sheet construction of another embodiment of the packaging material according to the present invention.

In the embodiment according to FIG. 3, with respect to the construction according to FIG. 1, another adhesive coating layer 2 is added on the opposite side of the fiber substrate 1. In terms of its composition and layer weight, this second coating layer 2 corresponds to that which was presented above in regard to the first adhesive coating layer 2 of FIGS. 1 and 2. When forming the package, the heat sealing layer 3 can be sealed to the second adhesive coating layer 2 of the opposite side of the paper board 1.

Figure 4:
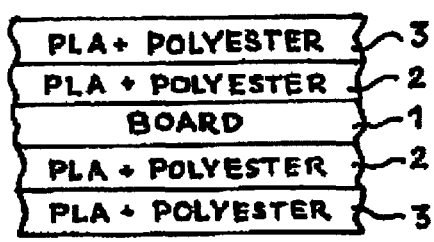
FIG. 4 is a cross-sectional schematic view of the sheet construction of another embodiment of the packaging material according to the present invention.

In FIG. 4, the fiber substrate 1 is provided on both sides thereof with polymeric coating layers 2, 3 that correspond to FIG. 1, so that the coated paper board has a symmetrical construction. When forming the package, the heat sealing layers 3 of the opposite sides of the fiber substrate 1 can be sealed to one another.

Figure 5:
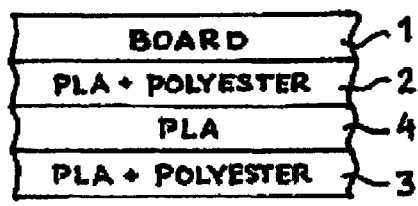
FIG. 5 is a cross-sectional schematic view of the sheet construction of another embodiment of the packaging material according to the present invention.
Figure 6:
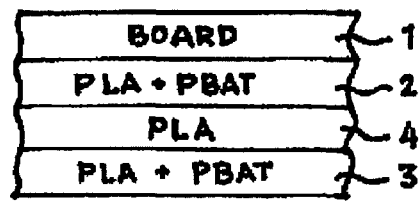
FIG. 6 is a cross-sectional schematic view of the sheet construction of another embodiment of the packaging material according to the present invention.

The packaging materials according to FIGS. 5 and 6 differ from the corresponding materials according to FIGS. 1 and 2 only in that a layer of polylactide 4 is placed between the inner, adhesive coating layer 2 and the outer, heat sealing coating layer 3, its layer weight being 5-40 g/m$^2$, preferably 10-30 g/m$^2$. That which is presented above in connection with FIGS. 1 and 2 applies to the weights of the other layers 1, 2, and 4 of the present construction of the packaging materials shown in FIGS. 5 and 6.

Figure 7:
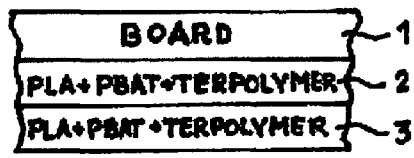
FIG. 7 is a cross-sectional schematic view of the sheet construction of another embodiment of the packaging material according to the present invention.

FIG. 7 shows an application of the constructions according to FIGS. 1 and 2, wherein both the inner and outer coating layers 2, 3 comprise, in addition to polylactide and polyester, also a blended acrylic copolymer, which in the figure is specified so as to be ethylene butylene acrylate glycidyl methacrylate terpolymer, in an exemplary manner. The portion of acrylic copolymer in each layer 2, 3 can be within 0.5-5 weight-%. In the inner coating layer 2, the acrylic copolymer has the effect of improving the adhesion between the inner coating layer 2 and the fiber substrate 1, and in the outer coating layer 3, the heat sealing ability of the layer. As an advantageous specific composition for the polymer of the inner coating layer 2, the following could be suggested: 85 weight-% of polylactide, 10 weight-% of 1,4-butanediolladipic acid/terephthalic acid copolyester (PBAT), and 5 weight-% of ethylene butylene acrylate glycidyl methacrylate terpolymer, and for the polymer of the outer layer 3: 70 weight-% of polylactide, 25 weight-% of PBAT, and 5 weight-% of ethylene butylene acrylate glycidyl methacrylate terpolymer. Suitable layer weights in the construction of FIG. 7 are the same as those in the constructions of the packaging materials shown in FIGS. 1 and 2.

Figure 8:
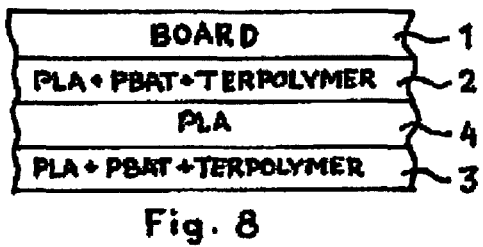
FIG. 8 is a cross-sectional schematic view of the sheet construction of another embodiment of the packaging material according to the present invention.

The embodiment according to FIG. 8 differs from the one in FIG. 7 only in that a layer of PLA 4 is placed between the inner adhesive coating layer 2 and the outer heat sealing coating layer 3, in a similar manner as in FIGS. 3 and 4. Suitable layer weights for each layer 1-4 correspond to those described above.

Figure 9:
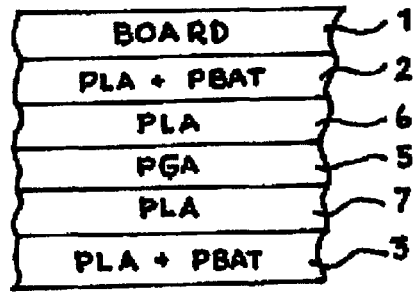
FIG. 9 is a cross-sectional schematic view of the sheet construction of another embodiment of the packaging material according to the present invention.

FIG. 9 shows a development of the sheet construction according to FIGS. 5 and 6, where instead of the intermediate layer 4 of polylactide, there are a layer of poly-glycolic acid (PGA) 5 and layers of polylactide 6, 7 on both sides of the PGA layer 5. The fiber substrate 1 thus has a polymeric five-layer coating, which is introduced onto the fiber substrate by coextrusion, similarly to the multi-layer coatings according to the FIGS. 1-6 above. In the construction of FIG. 9, PGA can be replaced by polyvinyl alcohol (PVOH).

EXAMPLES

1. Adhesion

Various polymeric single-layer coatings were introduced onto the paper board by extrusion, and their adhesion to the board surface was defined on a scale of 1-5, whereby the classification was as follows:

1=no adhesion, the polymeric layer peels off;
2=poor adhesion, some fibers are stuck to the polymeric layer that peels off;
3=poor adhesion, when detaching the polymeric layer, less than 50% of the paper board breaks in the area of coating;
4=moderate adhesion, when detaching the polymeric layer, over 50% of the paper board breaks in the area of coating;
5=perfect adhesion, when detaching the polymeric layer, the paper board breaks throughout the area of coating.

The coating polymers tested comprised polylactide (PLA) as such or blended with various polyesters (polyesters 1-6) or with polyesters and an additive that consisted of acrylic copolymer. The polyesters and the additive were:
Polyester 1=PBS
Polyester 2=PBS
Polyester 3=PBAT
Polyester 4=PBAT
Polyester 5=PBSA
Polyester 6=PBAT
Additive=ethylene butylene acrylate glycidyl methacrylate terpolymer.

The results for the various polymer compositions and layer weights are in the following Table 1. Table 2 further shows results for various polymer compositions on a layer weight of 25 g/m$^2$. In each polymer mixture, PLA constitutes the rest of the mixture, so that the portions of components total in 100%.

TABLE 1

| Polymer | Layer weight (g/m$^2$) | Adhesion |
| --- | --- | --- |
| PLA | 38.8 | 5 |
| PLA | 31.1 | 5 |
| PLA | 25.7 | 4 |
| PLA | 20.7 | 4 |
| PLA | 18.9 | 3 |
| PLA + 50% Polyester 1 | 18.6 | 5 |
| PLA + 25% Polyester 1 | 19.0 | 5 |
| PLA + 25% Polyester 1 | 16.7 | 5 |
| PLA + 25% Polyester 1 | 14.1 | 4 |
| PLA + 10% Polyester 2 | 19.3 | 5 |
| PLA + 10% Polyester 2 | 12.7 | 3 |
| PLA + 10% Polyester 2 | 6.0 | 1 |
| PLA + 40% Polyester 3 | 16.4 | 5 |
| PLA + 40% Polyester 3 | 14.06 | 4 |
| PLA + 20% Polyester 3 | 22.3 | 5 |
| PLA + 20% Polyester 3 | 15.5 | 4 |
| PLA + 20% Polyester 3 | 12.8 | 3 |
| PLA + 40% Polyester 4 | 15.72 | 5 |
| PLA + 40% Polyester 4 | 12.3 | 3 |
| PLA + 40% Polyester 4 | 8.42 | 2 |
| PLA + 50% Polyester 5 | 24.26 | 5 |
| PLA + 50% Polyester 5 | 19.18 | 5 |
| PLA + 30% Polyester 5 | 21.5 | 5 |
| PLA + 30% Polyester 5 | 20.78 | 4 |
| PLA + 30% Polyester 5 | 15.9 | 4 |
| PLA + 30% Polyester 5 | 15.64 | 4 |
| PLA + 30% Polyester 5 | 12.28 | 3 |
| PLA + 25% Polyester 5 | 26.68 | 5 |
| PLA + 25% Polyester 5 | 20.72 | 5 |
| PLA + 25% Polyester 5 | 17.24 | 4 |
| PLA + 20% Polyester 5 | 27.58 | 5 |
| PLA + 20% Polyester 5 | 22.12 | 4 |
| PLA + 20% Polyester 5 | 19.6 | 4 |
| PLA + 10% Polyester 5 | 32.38 | 5 |
| PLA + 10% Polyester 5 | 26.8 | 5 |
| PLA + 10% Polyester 5 | 21.9 | 5 |
| PLA + 40% Polyester 6 | 24.92 | 5 |
| PLA + 40% Polyester 6 | 23.76 | 5 |
| PLA + 40% Polyester 6 | 23.26 | 4.5 |
| PLA + 40% Polyester 6 | 14.5 | 3.5 |
| PLA + 20% Polyester 2 + 5% additive | 14.2 | 5 |
| PLA + 20% Polyester 2 + 5% additive | 13.38 | 4.5 |
| PLA + 20% Polyester 2 + 5% additive | 11.38 | 3.5 |

TABLE 1-continued

| Polymer | Layer weight (g/m²) | Adhesion |
|---|---|---|
| PLA + 10% Polyester 2 + 5% additive | 16.46 | 5 |
| PLA + 10% Polyester 2 + 5% additive | 14.3 | 5 |
| PLA + 10% Polyester 2 + 5% additive | 15.66 | 4.5 |
| PLA + 10% Polyester 2 + 5% additive | 10.72 | 3 |
| PLA + 10% Polyester 6 + 5% additive | 21.74 | 5 |
| PLA + 10% Polyester 6 + 5% additive | 19 | 4.5 |
| PLA + 10% Polyester 6 + 5% additive | 17.26 | 5 |
| PLA + 10% Polyester 6 + 5% additive | 13.88 | 3.5 |
| PLA + 10% Polyester 6 + 5% additive | 9.6 | 2.5 |
| PLA + 10% Polyester 6 + 5% additive | 7.2 | 2 |

TABLE 2

| Polymer | Adhesion on a layer weight of 25 g/m² |
|---|---|
| PLA | 4 |
| PLA + 50% Polyester 1 | 5 |
| PLA + 25% Polyester 1 | 5 |
| PLA + 40% Polyester 2 | 5 |
| PLA + 10% Polyester 2 | 5 |
| PLA + 40% Polyester 3 | 5 |
| PLA + 20% Polyester 3 | 5 |
| PLA + 10% Polyester 3 | 5 |
| PLA + 40% Polyester 4 | 5 |
| PLA + 50% Polyester 5 | 5 |
| PLA + 30% Polyester 5 | 5 |
| PLA + 25% Polyester 5 | 5 |
| PLA + 20% Polyester 5 | 5 |
| PLA + 10% Polyester 5 | 5 |
| PLA + 40% Polyester 6 | 5 |
| PLA + 20% Polyester 2 + 5% additive | 5 |
| PLA + 10% Polyester 2 + 5% additive | 5 |
| PLA + 10% Polyester 6 + 5% additive | 5 |

The results indicate that the added polyesters improve the adhesion of polylactide, which is indicated by achieving a perfect adhesion on lower coating layer weights. Generally speaking, when the portion of polyester in the mixture increases, the adhesion improves, but when using a practicable layer weight of 25 g/m², acceptable adhesion can be achieved with a mixture portion as low as 10-20%. It is also obvious that the added acrylic copolymer further improves the adhesion.

2. Heat Sealing Onto the Paper Board Surface

Pieces of paper board that were extrusion-coated with different polymers were heat sealed onto a blank board surface. Sealing between the polymer coating and the board surface was defined on a scale of 1-5, whereby the classification was:

1=no sealing

2=poor sealing, sealed surfaces could be detached from each other essentially in one piece;

3=poor sealing, when detached, less than 50% of the board breaks in the area of polymer coating;

4=moderate sealing, when detached, over 50% of the board breaks in the area of polymer coating;

5=perfect sealing, when detached, the board breaks throughout the area of coating.

The coating polymers consisted of polylactide or mixtures of polylactide and polyesters and possibly the acrylic polymer that was added as an additive, as above in the adhesion testing. The results, in other words, sealing at different sealing temperatures, are shown in Table 3. Furthermore, the Table 4 includes the lowest sealing temperature of each coating polymer for achieving a perfect sealing and an evaluation of the sealing ability based on the same.

TABLE 3

| Polymer | Heat sealing temperature (° C.) | | | | | | | | | | | | |
|---|---|---|---|---|---|---|---|---|---|---|---|---|---|
| | 100 | 110 | 120 | 125 | 130 | 135 | 140 | 145 | 150 | 155 | 160 | 165 | 170 |
| PLA | 1 | 2 | 2 | 3 | 3 | 3 | 3 | 3.5 | 4.5 | 4.5 | 4.5 | 4.5 | 5 |
| PLA + 40% Polyester 3 | | 2 | 2.67 | 2.67 | 3 | 3 | 3.67 | 4.33 | 5 | 5 | 5 | 5 | 5 |
| PLA + 50% Polyester 5 | 3 | 3.33 | 4.33 | 5 | 5 | 5 | 5 | 5 | 5 | 5 | 5 | 5 | 5 |
| PLA + 25% Polyester 5 | 2 | | 3 | 3 | 3.67 | 4 | 4.33 | 5 | 5 | 5 | 5 | 5 | 5 |
| PLA + 40% Polyester 6 | | | 3 | | 3.5 | 3.5 | 4.5 | 4.5 | 5 | 5 | 5 | 5 | 5 |
| PLA + 10% Polyester 6 + 5% additive | 1 | 2 | 3 | 3 | 3.5 | 3.5 | 4.5 | 4.5 | 5 | 5 | 5 | 5 | 5 |
| PLA + 5% additive | | 2 | 2.33 | 2.67 | 3 | 3 | 3.33 | 4 | 4.67 | 4.67 | 5 | 5 | 5 |

TABLE 4

| Polymer | Lowest sealing temperature (° C.) | Sealing ability |
|---|---|---|
| PLA | 170 | Poor |
| PLA + 40% Polyester 3 | 150 | Good |
| PLA + 50% Polyester 5 | 125 | Excellent |
| PLA + 25% Polyester 5 | 145 | Good |
| PLA + 40% Polyester 6 | 150 | Good |
| PLA + 10% Polyester 6 + 5% additive | 150 | Good |
| PLA + 5% additive | 160 | Sufficient |

The results indicate that the added polyesters improve the heat sealing ability of polylactide, which is evidenced by achieving a perfect sealability at lower sealing temperatures. Comparison of the results obtained with the different portions of polyester 5 in the mixtures proves that when the portion of polyester increases, the sealing temperature can be decreased, i.e., the sealing ability improves. An acceptable sealing temperature of 50° C. requires an about 25-40% portion of polyester in the mixture. The added acrylic polymer, however, enables a considerable decrease in the amount of polyester.

The invention claimed is:

1. A heat-sealable biodegradable packaging material, comprising
a fiber substrate, an inner polymeric coating layer, and an outer polymeric coating layer, the inner and outer polymeric coating layers extruded onto the fiber substrate, the inner polymeric coating layer positioned against the fiber substrate and comprising a first blend of polylactide and a biodegradable polyester to provide an adhesion between the inner polymeric coating layer and the fiber substrate, and the outer polymeric coating layer positioned to constitute an outer surface of the material and comprising a second blend of polylactide and a biodegradable polyester to provide a heat sealing ability of the outer polymeric coating layer, and the polylactide in the inner polymeric coating layer present in an amount greater than the amount of the polylactide in the outer polymeric coating layer, wherein the second blend of the outer polymeric coating layer comprises between about 35 weight-% and about 90 weight-% of polylactide, between about 10 weight-% and about 60 weight-% of biodegradable polyester, and between 0 weight-% and about 5 weight-% of acrylic copolymer.

2. The heat-sealable biodegradable packaging material according to claim 1, wherein the first blend of the inner polymeric coating layer and the second blend of the outer polymeric coating layers contain the same biodegradable polyester.

3. The heat-sealable biodegradable packaging material according to claim 2, wherein the biodegradable polyester in the first blend and the second blend is an aliphatic-aromatic co-polyester.

4. The heat-sealable biodegradable packaging material according to claim 3, wherein the biodegradable aliphatic-aromatic copolyester has been polymerized from 1,4-butanediol, adipic acid and terephthalic acid monomers.

5. The heat-sealable biodegradable packaging material according to claim 3, wherein the first blend of the inner polymeric coating layer and the second blend of the outer polymeric coating layer further comprise no more than 5 weight-% of acrylic copolymer that improves the adhesion of the inner polymeric coating layer and/or the heat sealing ability of the outer polymeric coating layer.

6. The heat-sealable biodegradable packaging material according to claim 5, wherein the acrylic copolymer is ethylene butyl acrylate glycidyl methacrylate terpolymer.

7. The heat-sealable biodegradable packaging material according to claim 1, wherein the first blend of the inner polymeric coating layer comprises between about 55 weight-% and about 95 weight-% of polylactide, between about 5 weight-% and about 40 weight-% of biodegradable polyester, and between 0 weight-% and about 5 weight-% of acrylic copolymer.

8. The heat-sealable biodegradable packaging material according to claim 7, wherein the first blend of the inner polymeric coating layer comprises between about 65 weight-% and about 90 weight-% of polylactide, between about 10 weight-% and about 30 weight-% of biodegradable polyester, and between 0 weight-% and about 5 weight-% of acrylic copolymer.

9. The heat-sealable biodegradable packaging material according to claim 1, further comprising at least one polymeric intermediate layer between the inner and outer polymer coating layers.

10. The heat-sealable biodegradable packaging material according to claim 9, wherein the at least one polymeric intermediate layer consists essentially of polylactide.

11. The heat-sealable biodegradable packaging material according to claim 9, wherein the at least one polymeric intermediate layer consists essentially of a biodegradable polymer that forms a barrier to water vapor and/or oxygen.

12. The heat-sealable biodegradable packaging material according to claim 11, wherein the biodegradable polymer of the at least one polymeric intermediate layer is polyvinyl alcohol or polyglycolic acid.

13. The heat-sealable biodegradable packaging material according to claim 1, wherein substrate layer having an uncoated surface located opposite the inner and outer polymeric coating layers, and the packaging material is heat sealed between the outer surface of the outer polymeric coating layer and the uncoated surface of the fiber substrate.

14. A heat-sealable biodegradable packaging material, comprising
a fiber substrate, an inner polymeric coating layer, and an outer polymeric coating layer, the inner and outer polymeric coating layers extruded onto the fiber substrate, the inner polymeric coating layer positioned against the fiber substrate and comprising a first blend of polylactide and a biodegradable polyester to provide an adhesion between the inner polymeric coating layer and the fiber substrate, and the outer polymeric coating layer positioned to constitute an outer surface of the material and comprising a second blend of polylactide and a biodegradable polyester to provide a heat sealing ability of the outer polymeric coating layer, and the polylactide in the inner polymeric coating layer present in an amount greater than the amount of the polylactide in the outer polymeric coating layer, wherein the second blend of the outer polymeric coating layer comprises between about 50 weight-% and about 80 weight-% of polylactide, between about 20 weight-% and about 45 weight-% of biodegradable polyester, and between 0 weight-% and about 5 weight-% of acrylic copolymer.

15. A method of manufacturing a packaging material, comprising:
extruding at least an inner coating layer and an outer coating layer that are superimposed onto a fiber substrate, the inner coating layer positioned against the fiber substrate and having a first blend comprising polylactide and a biodegradable polyester that improves the adhesion between the inner coating layer and the fiber substrate, the outer coating layer positioned to comprise an outer surface of the packaging material and having a second blend comprising polylactide and a biodegradable polyester that improves the heat sealing ability of the outer coating layer, and the polylactide in the first blend in the inner coating layer provided in an amount greater than the amount of the polylactide in the second blend of the outer coating layer;
wherein the second blend of the outer polymeric coating layer comprises between about 35 weight-% and about 90 weight-% of polylactide, between about 10 weight-% and about 60 weight-% of biodegradable polyester, and between 0 weight-% and about 5 weight-% of acrylic copolymer.

16. The method according to claim 15, wherein the extrusion comprises at least one intermediate layer positioned between the inner coating layer and the outer coating layer, the at least one intermediate layer consisting essentially of polylactide.

17. The method according to claim 15, wherein the extrusion comprises at least one intermediate layer positioned between the inner coating layer and the outer coating layer, the at least one intermediate layer consisting essentially of a biodegradable polymer that provides a barrier to water vapor and/or oxygen.

18. The method according to claim 17, wherein the biodegradable polymer is polyvinyl alcohol or polyglycolic acid.

19. The method according to claim 18, wherein the biodegradable polymer is positioned between a first intermediate layer and a second intermediate layer, the first and second intermediate layers consisting essentially of polylactide.

* * * * *